No. 795,950. PATENTED AUG. 1, 1905.
J. P. WRIGHT.
MATCH MACHINE.
APPLICATION FILED SEPT. 28, 1901.

No. 795,950. PATENTED AUG. 1, 1905.
J. P. WRIGHT.
MATCH MACHINE.
APPLICATION FILED SEPT. 28, 1901.

No. 795,950. PATENTED AUG. 1, 1905.
J. P. WRIGHT.
MATCH MACHINE.
APPLICATION FILED SEPT. 28, 1901.

Witnesses:
Jas. E. Hutchinson
Henry C. Hazard

Inventor.
Jacob P. Wright
by Prindle and Russell, his Attys

No. 795,950. PATENTED AUG. 1, 1905.
J. P. WRIGHT.
MATCH MACHINE.
APPLICATION FILED SEPT. 28, 1901.

—SHEET 9.

Witnesses:
Jas. E. Hutchinson.
Henry C. Hazard.

Inventor.
Jacob P. Wright,
by Prindle and Russell his Attys.

No. 795,950.

PATENTED AUG. 1, 1905.

J. P. WRIGHT.
MATCH MACHINE.
APPLICATION FILED SEPT. 28, 1901.

UNITED STATES PATENT OFFICE.

JACOB P. WRIGHT, OF AKRON, OHIO, ASSIGNOR TO THE DIAMOND MATCH COMPANY, OF NEW YORK, N. Y., A CORPORATION OF ILLINOIS.

MATCH-MACHINE.

No. 795,950.　　　Specification of Letters Patent.　　　Patented Aug. 1, 1905.

Application filed September 28, 1901. Serial No. 76,944.

*To all whom it may concern:*

Be it known that I, JACOB P. WRIGHT, of Akron, in the county of Summit, and in the State of Ohio, have invented certain new and useful Improvements in Match-Machines; and I do hereby declare that the following is a full, clear, and exact description thereof, reference being had to the accompanying drawings, in which—

Letters of like name and kind refer to like parts in each of the figures.

Figure 1:
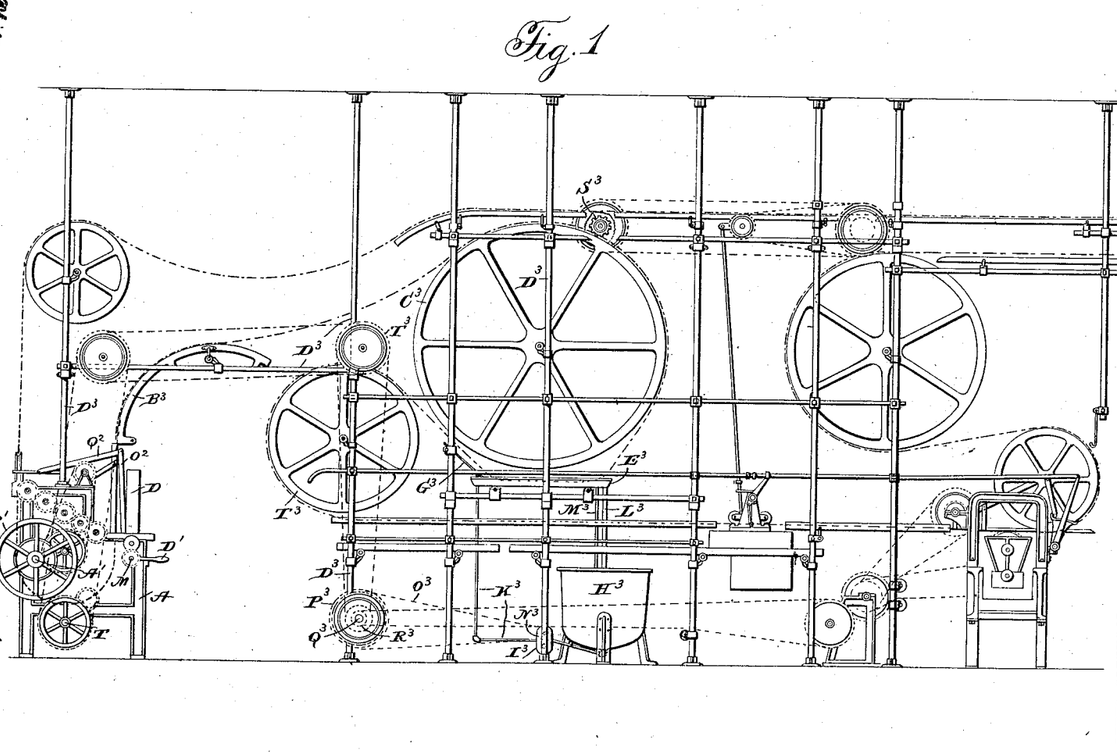
Figure 1 is a side elevation of portion of a match-machine embodying my invention.
Figure 2:
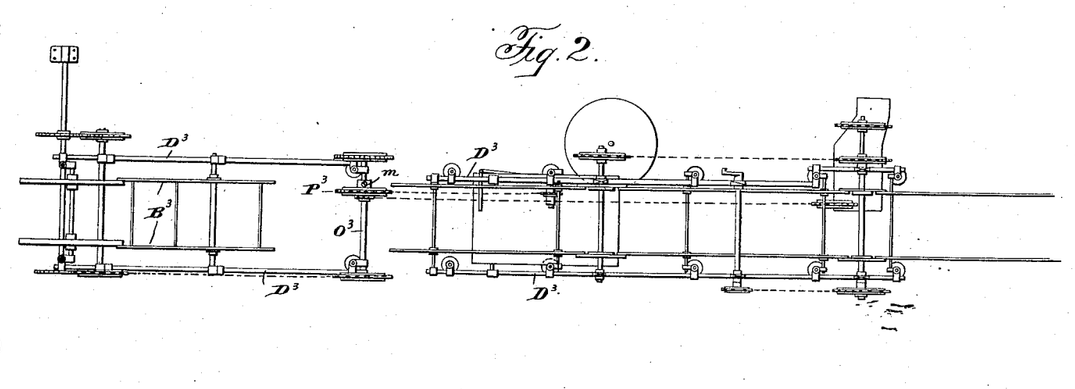
Fig. 2, a plan view of the same.
Figure 3:
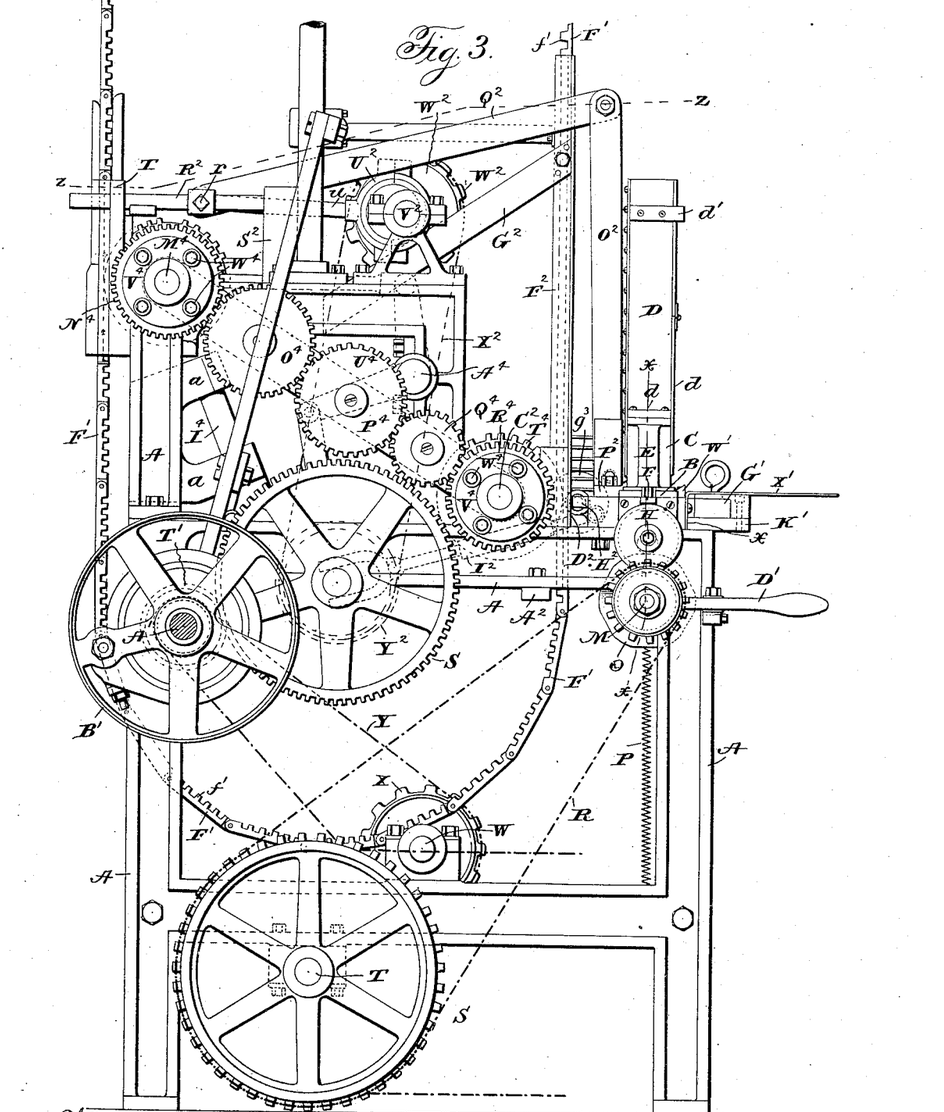
Fig. 3, a side elevation of the part of the machine for supplying the splints to the carrying mechanism and ejecting the finished matches therefrom.
Figure 4:
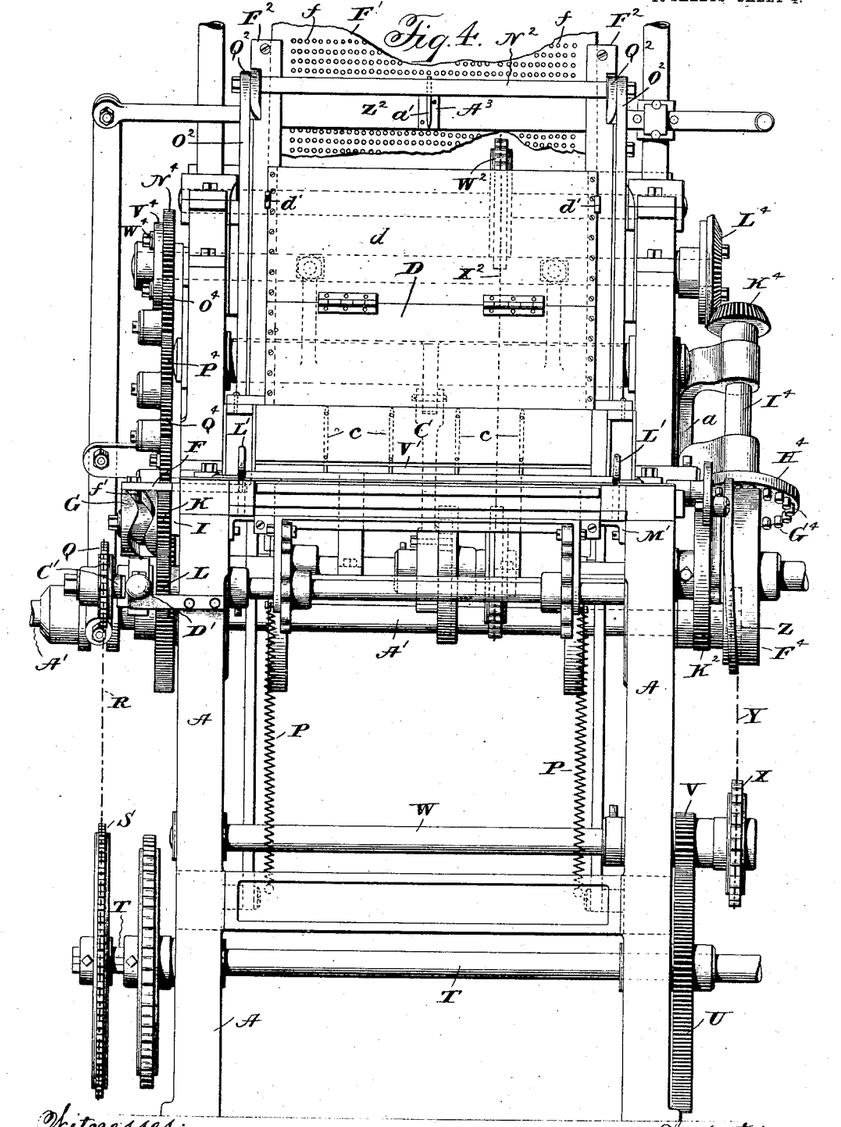
Fig. 4 is an end elevation of the same, a portion of the carrier being omitted.
Figure 5:
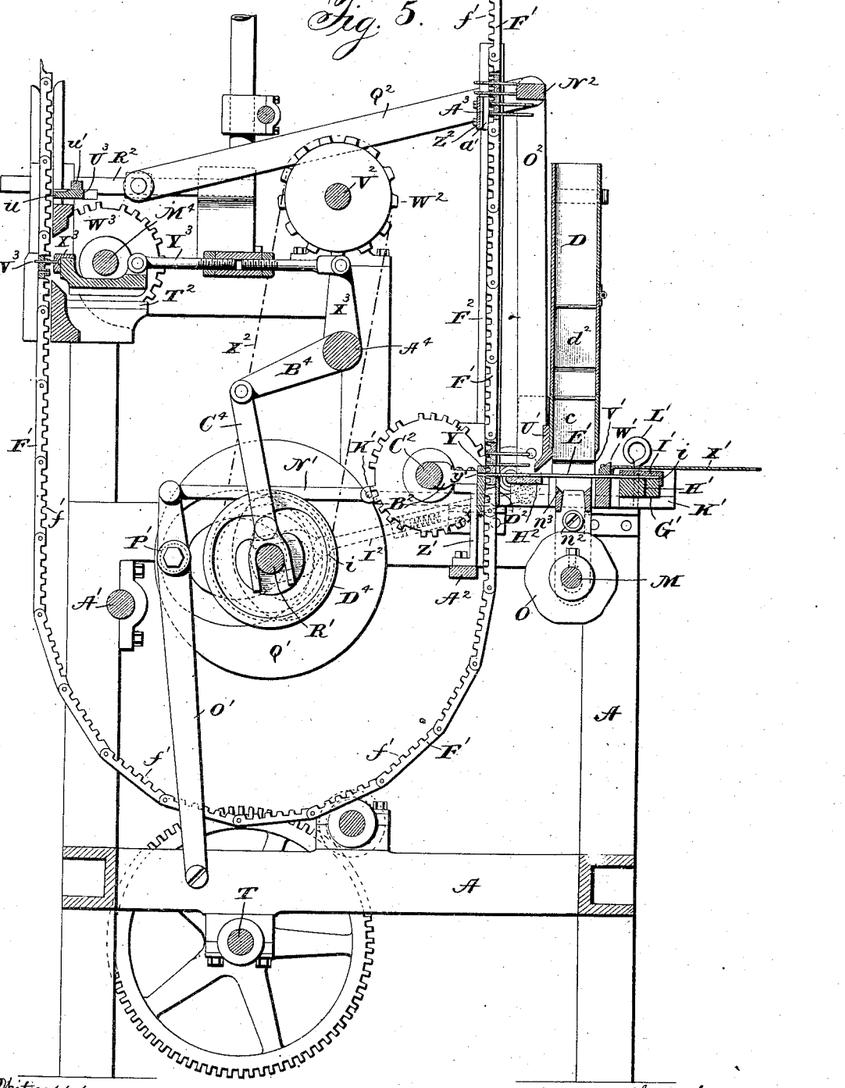
Fig. 5 is a vertical section thereof.
Figure 6:
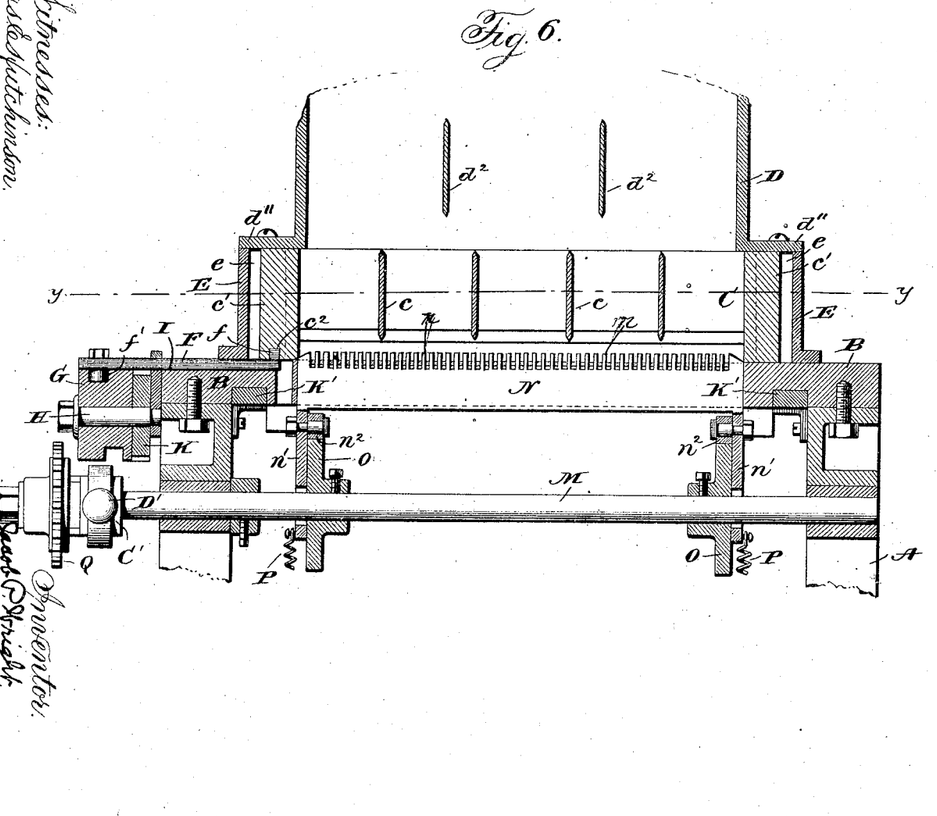
Fig. 6 is a detail view in section on the line $x\ x$ of Fig. 3.
Figure 7:
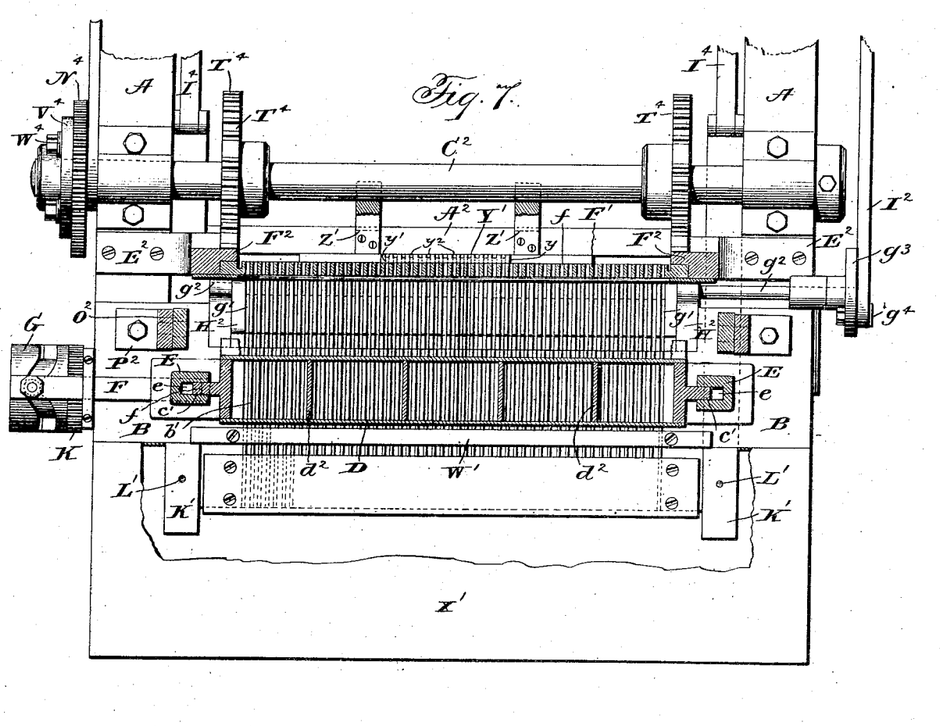
Fig. 7 is a horizontal section on the line $y\ y$ of Fig. 6.
Figure 8:
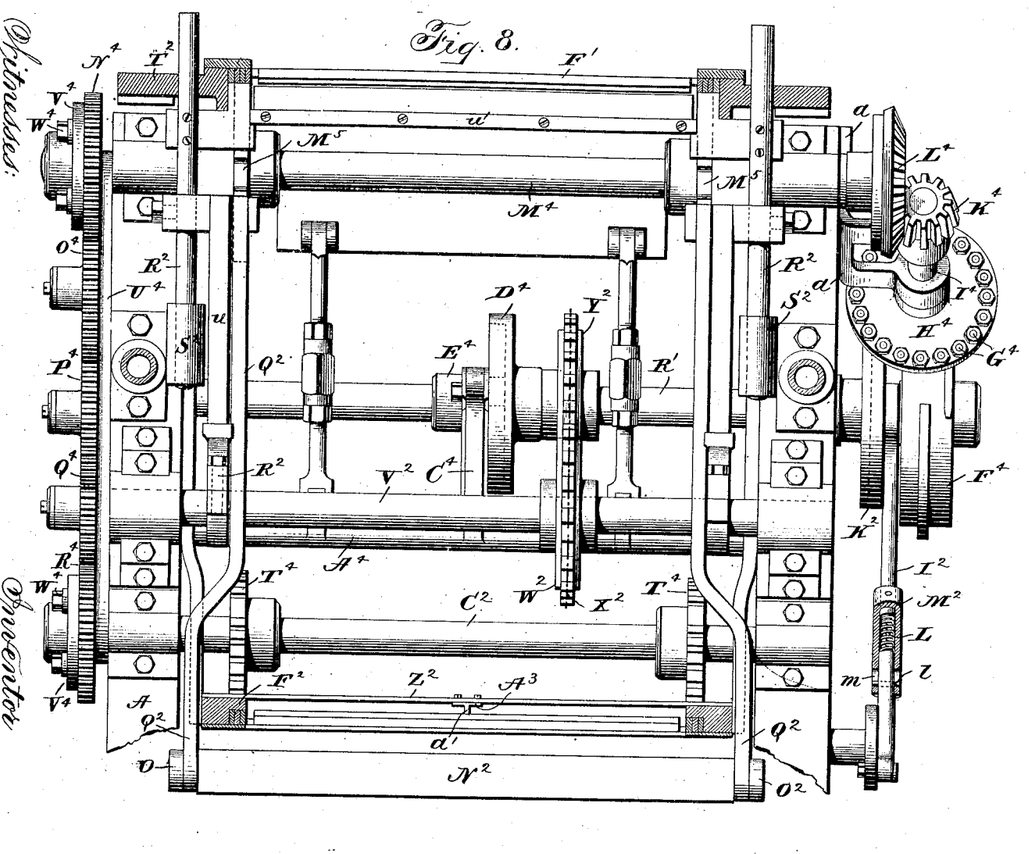
Fig. 8 is a horizontal section on the line $z\ z$ of Fig. 3.
Figure 9:
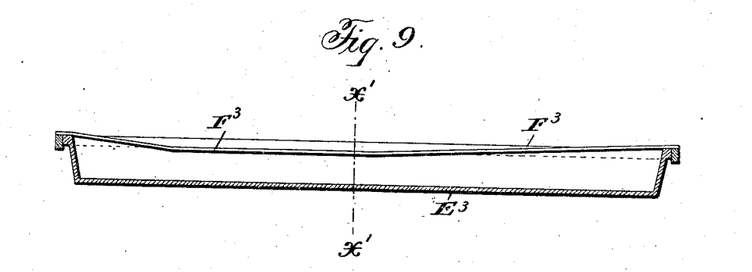
Fig. 9 is a detail view, in longitudinal vertical section, of the handle-solution pan.
Figure 10:
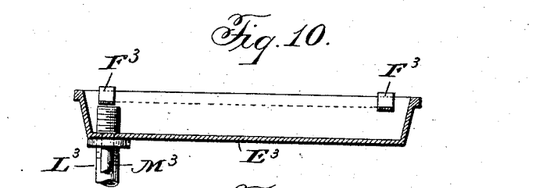
Fig. 10, a section on the line $x'\ x'$ of Fig. 9.
Figure 11:
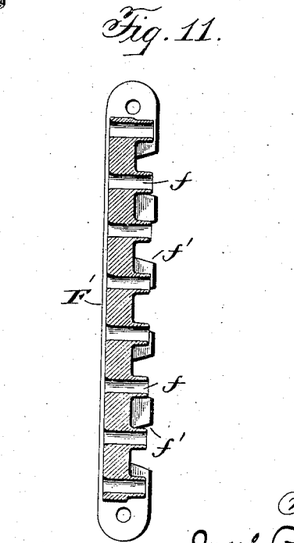
Fig. 11 is a detail view, in cross-section, of one of the carrier-plates.
Figure 12:
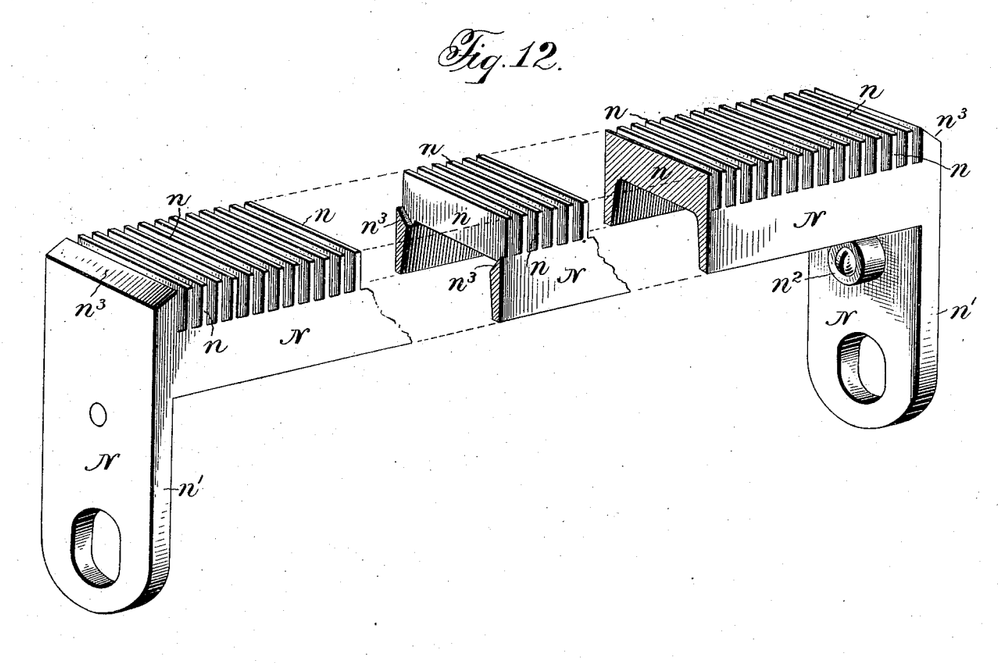
Fig. 12 is a perspective view of the bottom of the hopper.

The object of my invention is to improve the construction of machines for making matches; and to this end said invention consists in the machine and in the construction, arrangement, and combination of the parts thereof, substantially as hereinafter specified.

The class of match-machines to which my invention pertains is one in which the splints or sticks previously made in another machine are placed in a hopper and are supplied therefrom to an endless carrier by which they are taken to the various treating devices to be formed into matches and finally removed from the carrier, a machine of this general description having been invented by me and patented July 20, 1897, the patent being No. 586,890. I wish it understood, however, as to those features of my invention which are adaptable to match-machines of other types that I do not restrict myself in the use thereof to any one class or type of machine, and though the present machine is designed for use with wooden splints or sticks rectangular in cross-section it is to be understood that the scope of the invention is not limited by either the material of which the splints or sticks are composed or their shape, as in respect to some features of the invention sticks or splints of other material than wood and of other shapes of cross-section may be used.

In the embodiment of my invention which has been selected for illustration a frame A is employed, comprising two upright sides connected by transverse bars or beams. Of course any other form or construction of frame may, if preferred, be used. Mounted upon and extending from one of the frame sides to the other is a plate B, that constitutes the bottom of a splint-hopper that is composed of a lower horizontally-movable section C and an upper stationary or fixed section D. The latter at each end has a horizontal flange $d''$, that is secured by screws to a standard or bracket E, resting upon and fastened to the plate B. The upper portion of the outer side of the fixed hopper-section D is hinged to form a door $d$, so that the operation of placing splints or sticks in the hopper may be facilitated. A spring-latch $d'$ at each end of the section is employed to secure the door $d$ in closed position. In the portion of the hopper-section D below the door there are several vertical partitions $d^2$ and $d^2$ to keep the splints from getting awry or out of parallelism as they descend through the hopper. The horizontally-movable section C is provided with similar partitions $c$ and $c$, and the latter are preferably more numerous than the partitions in the fixed section. At each end the movable hopper-section C has a vertical rib $c'$, that engages a vertical slot $e$ in the adjacent standard E, said ribs and slots forming guides for the hopper-section in its horizontal reciprocation. In the lower edge of one of the ribs $c'$ is a notch $c^2$, that is engaged by a lug $f$ on the upper side of a bar F, horizontally movable in a guide-groove in the upper side of the hopper-bottom B by a cam G, with which a roller $f'$ on the bar engages. The cam G is journaled on a stud-shaft H, that is fastened to and projects horizontally from a plate I, secured by screws to the adjacent side of the frame A. Attached to the cam and situated between it and said plate is a gear-wheel K, with which meshes a gear-wheel L on a shaft M, mounted in bearings on the frame A and driven in the manner described hereinafter.

In the plate B are formed a series of vertical slots $b'$ $b'$, that run in a direction parallel with that in which the splints extend in the hopper, the spaces between each pair of adjacent slots being of a size to receive and support a splint. The slots open into a large cavity or opening beneath the plate B. In such cavity or opening is an open bar or frame N, having on its upper side a series of fingers or ribs $n$ $n$, corresponding with and extending through and above the slots to afford between adjacent slots spaces or grooves for the reception of a row of match-splints. The fingers or ribs also engage the mass of splints within the hopper. At each end said frame N has a downward extension $n'$, on the inner side of which mounted on a stud is a roller $n^2$, that engages a cam O on the shaft M, into contact with the periphery of which the roller is held by a spring P, attached at its upper end to the extension and at its lower end to the frame A. By the conjoint action of the cams and the springs the frame is given a rapid vertically-reciprocating movement, whereby the splints in the hopper are agitated by the engagement therewith of the upper ends of the fingers $n$ and $n$. Preferably the extensions $n'$ and $n'$ are carried to a point below the shaft M, each being slotted for the accommodation of the shaft. It will be seen that the mass of splints within the movable section are given both a horizontal and a vertical motion, and as a result of this compound motion they are agitated, so that they readily pass downward, and clogging is avoided. The vertical motion, which is preferably comparatively short, has the effect of moving the entire mass of splints in the hopper and results in evening or straightening them, so that they are in position to enter the spaces between the projecting fingers $n$. The descending motion of the vertical agitator is sufficiently quicker than the possible speed of fall of the splints by gravity as to free the lowermost splints of the mass from contact with the fingers $n$ and $n$, and thus enable them to settle readily into the spaces. The described action of the vertical agitator is especially efficient in the case of splints that are square in cross-section, as because of this shape there is greater liability of the splints to interlock and clog. The top of the frame N at each side is beveled or inclined downwardly and outwardly, so that the surface present to any splints that may be moved sidewise by the sidewise movement of the vibratory hopper-section into contact with the frame N will be an inclined one, over which the splints will rise and not be crushed or cause the jamming of the machine. The bottoms $n^3$ and $n^3$ of the slots or spaces between the fingers $n$ and $n$ are inclined downward and inward and open into the open space of the frame, so that any dust or fuzz will pass readily off such bottoms and fall through the frame.

The shaft M, from which both the lateral vibration of the hopper-section C and the vertical vibration of the agitator N are produced, may be conveniently driven by providing a sprocket-wheel Q thereon, which by a sprocket-chain R is connected to a larger sprocket-wheel S on a shaft T, journaled in bearings near the bottom and front of the frame A, on which shaft T is a gear U, in mesh with a pinion V on a shaft W, also journaled in bearings on the frame A. From a sprocket-wheel X on the shaft W a chain Y runs to a sprocket-wheel Z on the main driving-shaft A', journaled in bearings well toward the front end of the frame A and provided, as usual, with a band-wheel B'.

As it is desirable at times, as when the feed of splints from the hopper to the carrier is to be arrested, to stop the agitation of the splints, provision is made to stop the vibration of the hopper-section C and the agitator-frame N by mounting the sprocket-wheel Q loose on the shaft N and providing a clutch C', adapted to be shifted by a hand-lever D' to couple and uncouple the sprocket-wheel Q and said shaft.

For removing the splints from the spaces between the fingers $n$ projecting through in the hopper-bottom B there is a series of rods E' and E', one for each groove $b$, that constitute ejectors or beaters that engage the ends of the splints and force them endwise from the hopper and into the holes or openings $f$ and $f$ of the plates F' and F' of the endless carrier, said ejectors or beaters being attached to and carried by a reciprocating head or bar G'. The preferable mode of attachment of the beaters to the bar G' is to place each beater in a groove in the upper side of the bar and secure it therein by a pin H' and a plate I', that lies over all the beaters, being fastened to the top of the bar by screws. A flange $i$, depending from the plate I' and overlapping the ends of the beaters flush with the side of the bar G', takes the thrust of the beaters. At each end the beater G' is attached to a horizontally-reciprocating bar K' by a pin L', which passes vertically through a hole in the beater-bar and alining holes in portions of the bar K' above and below the beater-bar, the portion of the bar K' above the beater-bar being the horizontal member of an angle-piece attached to said bar K' and against whose vertical member the beater-bar abuts. The pins L' and L' are readily removable, so that when it is desired to stop the movement of the beaters to cease the feed of splints thereby from the hopper it can easily be done by disconnecting the beater-bar from the bars K' and K' from which the beaters receive their motion, the movement of said bars K' and K' being uninterrupted. The bars K' and K' reciprocate, respectively, in slots in the under side of the hopper-bottom B, each bar being supported on an angle-plate M', fastened to the inner side of one of the sides of the frame A. A rod or link N' connects each bar K' with the upper end of a lever O', that is pivoted at its lower end to the frame side, and near its upper end has a roller P', which engages a cam Q', by which the lever is vibrated, and so the bars K' and K' reciprocated. The cam Q' is on a shaft R', journaled in bearings on the frame A, on which shaft is a gear-wheel S', meshing with a pinion T' on the main driving-shaft.

On the side of the hopper from which the splints emerge when pushed by the beaters the lower part of the hopper-wall in the form of a plate U' is inclined downward and outward, its lower edge being just above the row of splints pushed out by the beaters. The object of this inclined surface is to cause the camming or crowding down to proper horizontal position of any splints coming from the hopper with their advancing ends too high, by reason of any inclination of the splints, which splints, should a vertical wall be encountered, would be crushed or bent and cause clogging of the hopper. At the bottom of the opposite wall of the hopper there is provided an opening V' to enable the contents of the hopper at the bottom to be inspected and for the removal of any splints out of position and obstructing the proper feeding of the splints from the hopper. Opposite such opening V' is a bar W', having a surface next the opening inclined downward and toward the hopper to cause any splints tending to work out through said opening to pass back into the hopper as they descend.

To prevent possible injury to the fingers by pinching, &c., by the moving beater mechanism, a guard-plate X', of sheet metal, is placed over said parts, being fastened to the hopper-bottom B, near each end thereof, by screws that pass through slots in vertical extensions $x$ and $x$ at the respective ends of said guard-plate.

For supporting the carrier-plates F' and F' against thrust when a row of splints is pushed into a row of holes of the same a backing-plate Y' is provided on the side of the carrier opposite the side from which the splints are inserted. Said plate Y' is fastened near each end by screws to two brackets Z' and Z', bolted to a cross-bar A², fastened to the two sides of the frame A. The plate Y' has a vertical extension $y$ at its central portion, reaching above the plane of the reciprocation of the beaters, the purpose of which is to provide a sufficient support for the carrier-plate F' when the last row of holes $f$ and $f$ therein is in position to receive splints, said last row being so close to the lower edge of the plate as to leave an insufficient portion thereof below the same to bear against the backing-plate below the plane of reciprocation of the beaters. That portion of the backing-plate Y' on each side of the extension $y$ is below the plane of the beaters and the plane of the row of carrier-plate holes $f$ and $f$, so that any fragments of splints that may be present in said holes $f$ and $f$ at the time of insertion of the row of splints will be free to be pushed out by the latter instead of themselves or the splints being crushed. For a similar purpose the extension $y$ is provided with a row of holes or perforations $y^4$ and $y'$, that aline with the beaters and the row of splint-receiving holes $f$ and $f$, any pieces or ends of splints in those of the latter alining with the backing-plate holes being pushed from said carrier-plate holes $f$ and $f$. As the ends of the splints when inserted in the holes $f$ and $f$ may protrude slightly on the rear side of the carrier-plate, the extension $y$ has a vertical slot $y^2$ on its side next the carrier, leading from each hole $y'$ to the upper edge of the extension, through which the protruding end of a splint may freely pass as the carrier-plate moves along. For bracing the bracing-plate horizontally there is secured to a horizontal flange on the top of each bracket Z' and Z' a block B², that bears against a shaft C², journaled in bearings on the frame A and forming part of the carrier-driving mechanism, to be described hereinafter.

As in the machine of the patent hereinbefore referred to, the splints when moved into the carrier-plate perforations by the beaters are guided by a guide-plate D², that has alining with each plate perforation $f$ the lower end of a vertical slot $b$ for each splint, the upper end of the slot being open for the upward passage of the splint when the carrier is moved along. Said guide-plate D² is attached at its opposite ends to two brackets E² and E², that are respectively secured to the two sides of the frame A. To said brackets are also fastened the lower ends of vertical side guides F² and F² for the carrier-chain, said guides being braced near their upper ends by a brace G² for each that extends on an incline from the adjacent side of the frame A to the guide.

Intermediate the guide-plate D² and the hopper is a plate H², having splint-guiding grooves $g'$ and $g'$ in its upper side and pivoted by pintles $g^2$ and $g^2$ at opposite ends at its side next the guide-plate D² in bearings on the sides of the frame A. One of the pintles $g^2$ is prolonged, and on it is secured a disk $g^3$, having a crank-pin $g^4$, to which is pivoted one end of a rod I², near whose other end is a roller $i$, that engages a cam K² on the shaft R', by means of which the rod is reciprocated and the crank-disk oscillated to cause the plate H² to be lowered and raised. The parts are so timed that the lowering movement of the plate H² begins as soon as the beaters have reached the limit of their motion in thrusting splints into the carrier-plate, and the object of such lowering of the plate is to cause the removal therefrom of short or broken splints or other debris that may be thereon, which matter when the plate is tilted slides off therefrom. The rod $I^2$ is constructed to yield longitudinally in the event of the return or rising movement of the plate being opposed by clogging, and thus straining of the beaters and the plate or the latter being thrown out of time avoided. As preferably constructed for this purpose, the rod is composed of two parts or sections, between the ends of which a coiled spring $L^2$ is interposed, and encircling the rod-sections and spring is a tube $M^2$, fastened immovably to one section and slidingly to the other by a pin $l$, passing through the latter and a slot $m$ in the tube into which the pin extends. The spring keeps the rod-sections normally held apart; but if the rising movement of the plate is stopped the spring will yield, and when the cause of stoppage of the plate is removed the spring will act to restore the normal position of the parts.

The machine illustrated is designed for making what are known as "handle-matches," which are matches whose sticks or splints are treated at the ends by which they are held for igniting by some incombustible material in a liquid form. For treating the ends or portions that form the handles such portions are required to be projected well beyond the carrier-plate, and for so projecting the same the splints after being placed in the carrier by the beaters are afterward pushed farther through the holes $f$ and $f$ to the desired position. For such pushing or setting of the splints a setter-bar $N^2$ is employed mounted on the upper ends of a pair of levers $O^2$ and $O^2$, that are pivoted at their lower ends, respectively, to brackets $P^2$ and $P^2$ on the sides of the frame A. Each of the levers $O^2$ and $O^2$ at its upper end is connected by a link $Q^2$ to a horizontal rod $R^2$, supported and guided by a bracket $S^2$ near one end on a side of the frame A, and by a transverse plate $T^2$, secured to and reaching across from one frame side to the other. A pivot stud or pin $r$ on the rod $R^2$ is the connecting means between the latter and a link $Q^2$, and said stud or pin serves also to connect to the rod $R^2$ an eccentric $U^2$ by means of an eccentric-rod $u$. Through the described connections the eccentrics will vibrate the levers $O^2$ and $O^2$ and move the setter-bar $N^2$ to and from the carrier, said bar when moved toward the carrier striking and pushing a row of splints farther therethrough. The eccentrics $U^2$ and $U^2$ are mounted on a shaft $V^2$, journaled in bearings on the sides of the frame A and having a sprocket-wheel $W^2$, that is connected by a driving-chain $X^2$ to a driving sprocket-wheel $Y^2$ on the shaft $R'$. For supporting the carrier under the thrust of the setter-bar I attach a horizontal cross-bar $Z^2$ to the carrier-guides $F^2$ and $F^2$ at a point just below the place where the splints are moved by the setter-bar, and at its transverse center fasten a plate $A^3$, having a rib $a'$, that engages the side of the carrier opposite the setter-bar, said rib being thin enough to lie between two adjacent rows of splints and being extended upward sufficiently to have a portion to engage the carrier-plate in line with the thrust of the setter-bar.

From the guides $F^2$ and $F^2$ the carrier-plates, with the splints ready for dipping at both ends, pass over a quadrant-shaped guide $B^3$ and thence to and partially over a large wheel or drum $C^3$, said guide and wheel being supported on a framing $D^3$ of well-known construction composed of vertical and horizontal tubular bars or piping. Beneath the wheel or drum $C^3$ is a pan $E^3$ for the liquid material into which the handle portions of the splints are to be dipped, and at each side of the pan is a rail or track $F^3$, to which the splint-carrier passes from the drum or wheel. The rails or tracks incline downward from the top of the pan and then run horizontally at the level at which is had the desired submergence of the splints, and then incline upward gradually to the top of the pan at the side from which the splints leave the pan, the last-described inclination being such relative to the liquid that the dipped splints leave the latter and have sufficient time before passing from over the pan to enable any excess of liquid on the splints to drain or run off into the same. To provide for the contingency, however, of some liquid failing to pass from the splints before the latter travel from over the pan, an inclined plate $G^3$ is provided, against the upper side of which any drops of liquid pendent on the splints will touch and be taken off or upon which liquid will drip and running down the plate fall into the pan. The liquid may be supplied to the pan in any desired way, but I preferably provide a tank $H^3$, from which the liquid is taken by a pump $I^3$, preferably a rotary pump, and delivered by the latter through a pipe $K^3$ to the pan. An overflow-pipe $L^3$ for fixing the level of the liquid in the pan runs to the tank $G^3$, as does also a draw-off pipe $M^3$. For driving the pump a sprocket-wheel $N^3$ on the driving-shaft thereof is connected by a sprocket-chain $O^3$ to a sprocket-wheel $P^3$ on a shaft $Q^3$, mounted in bearings on the framing $D^3$. The sprocket-wheel $P^3$ is secured to the shaft by a set-screw $m$ in a hub on the wheel to enable the wheel to be freed from the shaft at will, so that when it is desired to run the machine without operating the pump it can be accomplished. Other provision for this purpose, such as a clutch, can be provided, if preferred. Power to drive the shaft $Q^3$ is obtained by connecting a sprocket-wheel $R^3$ thereon by sprocket-gearing to the shaft. The pan, drip-plate, pump, and shaft $Q^3$ are attached by suitable brackets to the framing $D^3$. To prevent the sag or weight of the portion of the carrier-chain passing from the guide $B^3$ to the drum $C^3$ from drawing or pulling out of the pan the portion necessary to travel along the rails of guides of the pan for dipping the handles, the chain is positively driven over said wheel or drum by means of a suitably-driven pinion $S^3$, that meshes with the rack-teeth on the carrier-plates. By positively driving the chain at this place the proper condition of the carrier for passage along the dipping-pan tracks is preserved. From the dipping-pan $E^3$ the carrier passes over a wheel or drum $T^3$ for inverting the carrier to place the ends of the splints to be paraffined and supplied with igniting composition downward, so that they may be in proper position for these customary treatments. As the special construction of these treating mechanisms forms no part of the present invention, they need not be described. After the splints receive the igniting composition they are retained in the carrier, as usual, long enough to allow the compostion to cool and harden, and the carrier then takes them to mechanism on the frame A, by which the completed matches are removed from the carrier. Said removing mechanism comprises means for first moving the matches partially through the carrier-holes, so that their ends are substantially flush with the inner side of the carrier-plate, and means for punching the matches from the holes. The first-mentioned means preferably consists of a plate $U^3$, attached at its ends to the under side of the respective guide rods or bars $R^2$ and $R^2$, the front edge $u$ of which is adapted to engage a transverse row of matches and moves them to the required position. On the upper side of the plate $U^3$ is a part which, as shown, is in the form of a bar $u'$, screwed to the plate, the front side or surface of which is in such position that any match-sticks that may project too far rearward will be engaged and moved to proper position for the action of the edge $u$ of the plate $U^3$. Match-sticks may be projected too far rearward by reason of their fitting the carrier-plate holes so loosely that they may be jarred or shaken from proper position, and because of the possibility of this occurring it is advisable to provide means for moving the deranged matches to position for the action of the plate $U^3$. The means for completing the removal of the matches comprises the well-known device of a series of pins or punches $V^3$ and $V^3$, one for each hole of a transverse row of holes, and mounted on a head $W^3$ reciprocable in horizontal guides on the plate $T^2$. The pins or punches are secured to the head by an angle-bar $X^3$, the vertical member of the bar extending down over the forward side of the head and having a row of horizontal holes to receive the punches, whose headed ends bear against the forward side of the head $W^3$, and the horizontal member of said bar overlapping and being screwed to the upper side of the head $W^3$. By the construction described it is a very easy matter to remove and replace punches, as there is ample room for the detachment of the angle-bar with the punches, and as the vertical member of the angle-bar affords an extended support for the pins or punches it is possible to do away with the punch-guiding plate heretofore necessary to be used. The omission of said plate not only results in the simplifying of the structure, but the punches can work better, because as there are but two instead of three points of contact and support for the punches there is less likelihood of binding. For reciprocating the punch-carrying head there are connected to it by two links $Y^3$ and $Y^3$ two crank-arms $Z^3$ and $Z^3$ on a rock-shaft $A^4$, mounted in bearings on the frame A. Said shaft is oscillated by a crank-arm $B^4$, to which motion is imparted through a link $C^4$ by a cam $D^4$ on the shaft $R'$, the link being pivoted at one end to the arm $B^4$ and at its other end forked to straddle the shaft and having a roller to engage the cam. The forked end of the link is confined laterally between the cam and a collar $E^4$ on the shaft $R'$. After the matches have been punched out of the carrier the latter returns again to the splint-hopper for receiving more splints.

The machine shown is of the type in which an intermittent movement is imparted to the portions of the carrier adjacent the splint-inserting and match-ejecting mechanisms, and a continuous movement is given the remainder. For imparting the intermittent or step-by-step motion to the carrier I place a worm-form cam $F^4$ on the shaft $R'$, that engages a series of pins $G^4$ and $G^4$ on a disk $H^4$ on the lower end of a shaft $I^4$, mounted on an incline in bearings on a bracket $a$, bolted to one of the sides of the frame A, which cam imparts an intermittent revolution to the shaft $I^4$. On the upper end of the latter is a bevel-pinion $K^4$, meshing with a bevel-gear $L^4$ on a horizontal shaft $M^4$, having bearings on the frame A, and on which are placed two gears $M^4$ and $M^4$, that mesh with the usual racks $f'$ and $f'$ on the carrier-plates. On the side of the frame A opposite the cam and pin-gearing the shaft $I^4$ has a gear-wheel $N^4$, which transmits motion through a train of four gears $O^4$, $P^4$, $Q^4$, and $R^4$ to the shaft $C^2$, having bearings on the frame A and carrying two gears $T^4$ and $T^4$, that also mesh with the carrier-racks $f'$ and $f'$. A bar $U^4$ extends between the shafts $M^4$ and $C^2$, and on it are mounted stud-shafts that journal the intermediate gears $P^4$, $Q^4$, and $R^4$. To support it against any strains from the train of gears connecting said two shafts, the bar is bolted to the adjacent side of the frame A. The pinion $K^4$ and the gear-wheels $N^4$ and $R^4$ are connected to their respective shafts by the familiar expedient of a disk $V^4$ on each shaft, having segmental slots and clamping-bolts $W^4$ passing through the slots into the respective gear-wheel. By freeing the shafts and gear-wheels the shafts can revolve independently of the wheels, and thus the position of the carrier-plate holes $f$ and $f$ relative to the splint-inserting and match-ejecting mechanisms be accurately adjusted, the slack of the carrier enabling such adjustment to be effected.

In view of the fact that the splints are moved endwise through the carrier-plate holes $f$ and $f'$ I counterbore the holes on the rear sides of the carrier, for the reason that by absorption of moisture the splints swell, and without the counterbore the splints would be cut or torn when moved through the holes. The holes are therefore counterbored at both ends. I prefer to make the surfaces of the counterbores convexly curved or rounded, not flat, as the rounded surfaces simply squeeze or compress the splints and do not tear or splinter them.

When it is desired to use the machine constructed as herein shown and described for the manufacture of matches not to be treated with a handle-forming solution, it is necessary merely to stop the pump $I^3$ by freeing the sprocket-wheel $O^3$ from the shaft $Q$ and drawing off the liquid from the pan. The same object can also be attained by stopping the action of the setter-bar $N^2$ and adjusting the carrier-supports farther from the paraffining and composition-applying mechanisms. Moreover, should it be desired, the machine could be built omitting those parts necessary for making the handles, and it is therefore to be understood that I do not limit the scope of the invention to machines for the manufacture of handle-matches.

Having thus described my invention, what I claim is—

1. In a match-machine, the combination of a splint holder or receptacle having a bottom with parallel slots therethrough, a vibratory series of fingers extending through and above said slots to afford spaces therebetween for the reception of a row of splints, and means for vibrating said fingers, substantially as described.

2. In a match-machine, the combination of a splint holder or receptacle having a bottom with parallel slots therethrough, a vertically-movable frame below said bottom provided with a series of fingers corresponding to and extending through and above said slots to afford between said slots a series of spaces for the reception of a row of splints, and means for actuating said frame, substantially as described.

3. In a match-machine, the combination of a splint holder or receptacle having a bottom with parallel slots therethrough, a vertically-movable open or chambered frame below said bottom provided with fingers corresponding to and extending through and above said slots to afford between said slots a series of spaces for the reception of a row of splints, substantially as described.

4. In a match-machine, the combination of a splint holder or receptacle having a bottom with parallel slots therethrough, a series of fingers corresponding with and extending through and above said slots to afford between said slots a series of spaces for the reception of a row of splints, the end fingers adjacent the sides of the receptacle being inclined as described, and means for vertically vibrating said fingers, substantially as described.

5. In a match-machine, the combination of a splint holder or receptacle having a bottom with openings or slots, a vertically-movable chambered frame having inclined surfaces leading to the chamber or open space in the frame, said frame having fingers in the slots, substantially as described.

6. In a match-machine, the combination of a splint holder or receptacle having a bottom with openings or slots, and splint-supporting surfaces intermediate the slots, a splint-removing device for moving the splints from said surfaces, and splint-agitating devices that pass through the slots, substantially as described.

7. In a match-machine, the combination of a splint holder or receptacle having a bottom with openings or slots, splint-agitating fingers that pass through and above said slots and afford therebetween spaces for the reception of a row of splints, and a splint-removing device for moving the splints from said spaces, substantially as described.

8. In a match-machine, the combination of a splint holder or receptacle having a bottom with openings or slots, a vertically-movable frame located below said bottom and provided with splint-agitating fingers that pass through and above the slots and afford therebetween spaces for the reception of a row of splints, and splint-removing devices for moving the splints from said spaces, substantially as described.

9. In a match-machine, the combination of a splint holder or receptacle having a bottom with openings or slots, vertically-movable splint-agitating devices that pass through and above the slots and afford therebetween spaces for a row of splints, splint-removing devices for moving the splints from said spaces, and means for imparting horizontal movement to the splints above the said devices, substantially as described.

10. In a match-machine, the combination of a splint holder or receptacle having a bottom with openings or slots, vertically-movable splint-engaging devices that pass through and above the slots and afford therebetween spaces for a row of splints, a splint-removing device for moving the splints from said grooves, and a horizontally-movable holder-section next the bottom of the holder, substantially as described.

11. In a match-machine, a splint holder or receptacle having a horizontally-vibratory part for agitating the splints and causing them to settle downward, and a vertically-movable member for agitating the splints at the lower portion of said vibratory part and disposing them in parallelism with each other, said member having adjacent an end wall of said vibratory part, a splint-engaging portion which inclines inwardly and upwardly from said wall.

12. In a match-machine, a splint holder or receptacle having a horizontally-vibratory part for agitating the splints and causing them to settle downward, and a vertically-movable member for agitating the splints at the lower portion of said vibratory part and disposing them in parallelism with each other, said member having adjacent the respective end walls of said vibratory part splint-engaging portions which incline inwardly and upwardly from said walls.

13. In a match-machine, the combination with a carrier, of a splint holder or receptacle adjacent thereto, means for horizontally agitating the splints above the bottom of the receptacle, a series of fingers projecting above the bottom of said receptacle to afford parallel spaces for the reception of a row of splints, means for vertically vibrating said fingers, and means for removing the splints endwise from said spaces to the carrier, substantially as described.

14. In a match-machine, the combination with a carrier, of a splint holder or receptacle adjacent thereto having a bottom with parallel slots, a frame beneath said bottom provided with a series of fingers which project through and above said slots, and afford parallel spaces for the reception of a row of splints, means for vertically vibrating said frame, and means for removing the splints endwise from said spaces to the carrier, substantially as described.

15. In a match-machine, the combination with a carrier, of a splint holder or receptacle adjacent thereto having a bottom with parallel slots, a vertically-partitioned frame located above said bottom, means for horizontally reciprocating said frame, a series of fingers projecting above the bottom of said receptacle to afford parallel spaces for the reception of a row of splints, means for vertically vibrating said fingers, and means for removing the splints endwise from said spaces to the carrier, substantially as described.

16. In a match-machine, the combination with a carrier, of a splint holder or receptacle adjacent thereto having a bottom with parallel slots, a vertically-partitioned frame above said bottom, means for horizontally reciprocating said frame, a frame beneath said bottom provided with a series of fingers which project through and above the said slots and afford parallel spaces for the reception of splints, means for vertically vibrating said frame, and means for removing the splints from said spaces to the carrier, substantially as described.

17. In a match-machine, the combination with a carrier, of a splint holder or receptacle adjacent thereto, means for horizontally agitating the splints above the bottom of the receptacle, a series of fingers projecting above the bottom of said receptacle to afford parallel spaces for the reception of a row of splints, means for vertically vibrating said fingers, means for removing the splints endwise from said spaces to the carrier, and a movable splint-support between the receptacle and the carrier adapted by its movement to discharge broken splints, &c., substantially as described.

18. In a match-machine, the combination of a splint-receptacle, a traveling carrier adjacent thereto, means for removing splints row by row from said receptacle and inserting them in said carrier, a movable splint-support between the receptacle and the carrier, said support having on its upper surface guides for the passage of the splints, and means for actuating said support to lower the portion thereof adjacent the receptacle and thereby discharge from the support the broken splints, &c., substantially as described.

19. In a match-machine, the combination of a splint-receptacle, a traveling carrier adjacent thereto, means for removing splints row by row from said receptacle and inserting them in said carrier, a pivotally-mounted splint-supporting plate between the receptacle and the carrier, said plate having on its upper surface guides for the passage of the splints and the axis of said plate being adjacent the carrier and automatic means whereby said plate is oscillated, to discharge therefrom broken splints, &c.; substantially as described.

20. In a match-machine, the combination of a splint-receptacle, a traveling carrier adjacent thereto, horizontal reciprocating mechanism to remove splints row by row from the receptacle to the carrier, a pivotally-mounted splint-supporting plate between said receptacle and carrier, said plate having on its upper surface guides for the passage of the splints &c., and the axis of said plate being adjacent the carrier and automatic means to swing said plate from a horizontal to an inclined plane when each row of splints has been inserted in the carrier by said reciprocating mechanism, substantially as described.

21. In a match-machine, the combination with a carrier, of a splint holder or receptacle adjacent thereto, means for horizontally agitating the splints above the bottom of the receptacle, a series of fingers projecting above the bottom of said receptacle to afford parallel spaces for the reception of a row of splints, means for vertically vibrating said fingers, means for removing the splints endwise from said spaces to the carrier, and a swinging plate between the receptacle and the carrier adapted by its movement to discharge broken splints, &c., substantially as described.

22. In a match-machine, the combination with a carrier and a splint holder or receptacle adjacent thereto, means for horizontally agitating the splints above the bottom of the receptacle, a series of fingers projecting above the bottom of said receptacle to afford parallel spaces for the reception of a row of splints, means for vertically vibrating said fingers, means for removing the splints endwise from said spaces to the carrier, a movable splint-supporting plate intermediate the receptacle and the carrier, means for operating said plate, and a yielding connection between the plate and its operating means, substantially as described.

23. In a match-machine, the combination of a source of supply of splints, a carrier, means to move splints from the source of supply to the carrier, a movable plate between the source of supply and the carrier, means for operating said plate, and a yielding connection between the plate and its operating means, substantially as described.

24. In a match-machine, the combination of a splint-carrier, means for inserting splints in the carrier from the outer side thereof, a reciprocating setter-head acting upon the free ends of the splints successively to cause the respective ends of the splints to project beyond both sides of the carrier, plural substance-applying means located at different points along the path of travel of the carrier so as to act upon the projecting portions of the splints on both sides of the carrier, a supplemental reciprocating head for acting upon the splints and returning them to their original position in the carrier, means for reciprocating one of said heads, and a connection between the two heads whereby they are simultaneously actuated, substantially as described.

25. In a match-machine, the combination of a traveling splint-carrier, means for inserting splints endwise into the carrier from the outer side of the latter, a push device for acting upon the free ends of the rows of splints successively to cause the respective ends of the splints to project beyond both sides of the carrier, plural substance-applying means located at different points along the path of travel of the carrier so as to act upon the projecting portions of the splints on both sides of the carrier, a supplemental reciprocating head for acting upon the splints and returning them to their original position in the carrier, mechanism for actuating said heads concertedly, a match-discharge head located below the said supplemental head, and means for reciprocating said discharge-head substantially as described.

In testimony that I claim the foregoing I have hereunto set my hand this 26th day of August, 1901.

JACOB P. WRIGHT.

Witnesses:
B. C. Ross,
O. A. Tickner.